US012607961B2

(12) United States Patent
Komanduri et al.

(10) Patent No.: US 12,607,961 B2
(45) Date of Patent: *Apr. 21, 2026

(54) METHOD AND SYSTEM FOR PATTERNING A LIQUID CRYSTAL LAYER

(71) Applicant: Magic Leap, Inc., Plantation, FL (US)

(72) Inventors: Ravi Kumar Komanduri, Austin, TX (US); Chulwoo Oh, Sammamish, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,896

(22) Filed: Oct. 8, 2023

(65) Prior Publication Data

US 2024/0036516 A1      Feb. 1, 2024

Related U.S. Application Data

(63) Continuation of application No. 17/100,387, filed on Nov. 20, 2020, now Pat. No. 11,815,854.

(Continued)

(51) Int. Cl.
  *G03H 1/02*      (2006.01)
(52) U.S. Cl.
  CPC ......... *G03H 1/0276* (2013.01); *G03H 1/0244* (2013.01); *G03H 2222/31* (2013.01);
(Continued)
(58) Field of Classification Search
  CPC ............... G03H 1/0276; G03H 1/0244; G03H 2222/31; G03H 2222/34; G03H 2222/36;
(Continued)

(56) References Cited

U.S. PATENT DOCUMENTS 6,850,221 B1    2/2005  Tickle
8,614,842 B2 * 12/2013  Aspnes ................. H10F 19/804
                                                              359/12

(Continued)

FOREIGN PATENT DOCUMENTS

JP          H03268383 A      11/1991
JP          2000089029 A      3/2000

(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.

(Continued)

*Primary Examiner* — Jyotsna V Dabbi
(74) *Attorney, Agent, or Firm* — Tobias Intellectual Property Law, PLLC

(57) ABSTRACT

An optical master is created by using a nanoimprint alignment layer to pattern a liquid crystal layer. The nanoimprint alignment layer and the liquid crystal layer constitute the optical master. The optical master is positioned above a photo-alignment layer. The optical master is illuminated and light propagating through the nanoimprinted alignment layer and the liquid crystal layer is diffracted and subsequently strikes the photo-alignment layer. The incident diffracted light causes the pattern in the liquid crystal layer to be transferred to the photo-alignment layer. A second liquid crystal layer is deposited onto the patterned photo-alignment layer, which subsequently is used to align the molecules of the second liquid crystal layer. The second liquid crystal layer in the patterned photo-alignment layer may be utilized as a replica optical master or as a diffractive optical element for directing light in optical devices such as augmented reality display devices.

15 Claims, 11 Drawing Sheets

Related U.S. Application Data

(60) Provisional application No. 62/939,514, filed on Nov. 22, 2019.

(52) U.S. Cl.
CPC ..... *G03H 2222/34* (2013.01); *G03H 2222/36* (2013.01); *G03H 2250/38* (2013.01)

(58) Field of Classification Search
CPC ............. G03H 2250/38; G03H 223/16; G03H 2240/15; G03H 2260/51; G03H 2270/55; G03H 2001/0439; G03H 2001/207; G03H 2001/205; G03H 1/20; G02B 2027/0109; G02B 2027/0123; G02B 5/3016; G02B 5/1833; G02B 5/1857; G02B 27/0172; G02F 1/133757; G02F 1/133776; G02F 1/133788
USPC .......................................................... 359/12
See application file for complete search history.

(56) References Cited

U.S. PATENT DOCUMENTS

| | | | |
|---|---|---|---|
| 11,815,854 | B2 | 11/2023 | Komanduri et al. |
| 2002/0110651 | A1* | 8/2002 | Suzushi ............... G02B 5/3016 |
| | | | 252/299.01 |
| 2004/0213133 | A1 | 10/2004 | Funato et al. |
| 2006/0028436 | A1 | 2/2006 | Armstrong |
| 2007/0081123 | A1 | 4/2007 | Lewis |
| 2010/0225876 | A1* | 9/2010 | Escuti ................... G02F 1/1337 |
| | | | 359/485.05 |
| 2012/0127062 | A1 | 5/2012 | Bar-Zeev et al. |
| 2012/0162549 | A1 | 6/2012 | Gao et al. |
| 2012/0188467 | A1 | 7/2012 | Escuti et al. |
| 2013/0082922 | A1 | 4/2013 | Miller et al. |
| 2013/0117377 | A1 | 5/2013 | Miller |
| 2013/0125027 | A1 | 5/2013 | Abovitz et al. |
| 2013/0208234 | A1 | 8/2013 | Lewis |
| 2013/0242262 | A1 | 9/2013 | Lewis et al. |
| 2014/0071539 | A1 | 3/2014 | Gao et al. |
| 2014/0177023 | A1 | 6/2014 | Gao et al. |
| 2014/0218468 | A1 | 8/2014 | Gao et al. |
| 2014/0267420 | A1 | 9/2014 | Schowengerdt et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt et al. |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao et al. |
| 2016/0026253 | A1 | 1/2016 | Bradski et al. |
| 2016/0161648 | A1* | 6/2016 | Gu ........................ G02B 5/1833 |
| | | | 430/321 |
| 2018/0143438 | A1* | 5/2018 | Oh ...................... G02B 27/0172 |
| 2018/0143509 | A1 | 5/2018 | Oh |
| 2018/0164645 | A1 | 6/2018 | Oh et al. |
| 2019/0049789 | A1 | 2/2019 | Markle et al. |
| 2019/0227375 | A1 | 7/2019 | Oh et al. |

FOREIGN PATENT DOCUMENTS

| | | |
|---|---|---|
| JP | 2003521074 A | 7/2003 |
| JP | 2003270610 A | 9/2003 |
| JP | 2005060373 A | 3/2005 |
| JP | 2005202104 A | 7/2005 |
| JP | 2006216162 A | 8/2006 |
| JP | 2006318515 A | 11/2006 |
| JP | 2018519542 A | 7/2018 |
| WO | 2019178614 A1 | 9/2019 |
| WO | 2020002930 A1 | 1/2020 |
| WO | 2021102165 A1 | 5/2021 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/ azuma/ ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/raskar/book/BimberRaskarAugmentedRealityBook.pdf.

EP20889099.6 Extended European Search Report dated Dec. 1, 2023.

International Preliminary Report on Patentability for PCT Application No. PCT/US20/061329, dated May 17, 2022.

International Search Report and Written Opinion for PCT Application No. PCT/US20/061329, dated Feb. 10, 2021.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).

JP2024-74391 Office Action mailed Feb. 10, 2025.

* cited by examiner

METHOD AND SYSTEM FOR PATTERNING A LIQUID CRYSTAL LAYER

PRIORITY CLAIM

This application is a continuation of U.S. application Ser. No. 17/100,387, filed on Nov. 20, 2020, which claims the benefit of priority under 35 U.S.C. § 119(e) of U.S. Provisional Application No. 62/939,514, filed on Nov. 22, 2019. The entire contents of each of the above-listed applications are hereby incorporated by reference into this application.

INCORPORATION BY REFERENCE

This application incorporates by reference the entirety of U.S. patent application Ser. No. 16/171,290 filed on Oct. 25, 2018, published as U.S. Patent Publication No. 2019/0227375 on Jul. 25, 2019. This application also incorporates by reference the entirety of U.S. patent application Ser. No. 15/835,108 filed on Dec. 7, 2017, published as U.S. Patent Publication No. 2018/0164627 on Jun. 14, 2018.

BACKGROUND

Field

This disclosure relates to methods and systems for patterning a liquid crystal layer.

Description of the Related Art

Liquid crystals may be manipulated to form various patterns, which may advantageously be applied to form, e.g., optical devices. For example, liquid crystal molecules in a liquid crystal layer may be oriented to form patterns with regular spacing and orientations, which may be utilized as diffractive optical features. Because the functionality of the liquid crystal layer depends upon the pattern formed by the liquid crystal molecules, there is a continuing need for methods and systems for reliably and efficiently forming liquid crystal layers with liquid crystal molecules having desired orientations and patterns.

SUMMARY

According to some implementations, a method is provided for forming a patterned liquid crystal layer. The method comprises providing an optical master that comprises an alignment layer including surface relief features, and a liquid crystal layer on the surface relief features, wherein liquid crystal molecules of the liquid crystal layer define a liquid crystal pattern. The method further comprises providing a photo-alignment layer disposed on a substrate and replicating the liquid crystal pattern in the photo-alignment layer by propagating light through the optical master to the photo-alignment layer.

According to some other implementations, a method this provided for forming an optical master. The method comprises providing a first optical master comprising an alignment layer including surface relief features, and a first liquid crystal layer on the surface relief features, wherein liquid crystal molecules of the first liquid crystal layer define a liquid crystal pattern. The method further comprises forming a second optical master by: providing a photo-alignment layer disposed on a substrate; replicating the liquid crystal pattern in the photo-alignment layer by propagating light through the optical master to the photo-alignment layer; and depositing a second liquid crystal layer on the photo-alignment layer, wherein the molecules of the second liquid crystal layer are aligned by the photo-alignment layer. The second optical master comprises the second liquid crystal layer, the photo-alignment layer, and the substrate.

According to yet other implementations, a method is provided for forming a patterned liquid crystal layer using a replica optical master. The method comprises providing a first optical master comprising an alignment layer including surface relief features, and a first liquid crystal layer on the surface relief features, wherein liquid crystal molecules of the first liquid crystal layer define a liquid crystal pattern. The method further comprises providing a photo-alignment layer disposed on a substrate and forming a second optical master by: replicating the liquid crystal pattern in the photo-alignment layer by propagating light through the optical master to the photo-alignment layer; and depositing a second liquid crystal layer on the photo-alignment layer, wherein the molecules of the second liquid crystal layer are aligned by the photo-alignment layer. The second optical master comprises the second liquid crystal layer, the photo-alignment layer, and the substrate. The method further comprises providing a second photo-alignment layer on a second substrate; positioning the second optical master over the second photo-alignment layer; and replicating the liquid crystal pattern in the second photo-alignment layer by propagating light through the second optical master to the second photo-alignment layer.

According to some other implementations, a method this provided for forming a patterned liquid crystal layer. The method comprises providing an optical master comprising: an alignment layer, and a liquid crystal layer on the alignment layer, wherein liquid crystal molecules of the liquid crystal layer define a liquid crystal pattern. The method further comprises providing a photo-alignment layer disposed on a substrate; and propagating light through the optical master to the photo-alignment layer to replicate the liquid crystal pattern in the photo-alignment layer by moving a collimated light source across the optical master.

Additional examples of various implementations are provided below.

Example 1. A method of forming a patterned liquid crystal layer, the method comprising:
  providing an optical master comprising:
    an alignment layer including surface relief features, and
    a liquid crystal layer on the surface relief features, wherein liquid crystal molecules of the liquid crystal layer define a liquid crystal pattern;
  providing a photo-alignment layer disposed on a substrate; and
  replicating the liquid crystal pattern in the photo-alignment layer by propagating light through the optical master to the photo-alignment layer.

Example 2. The method of Example 1, wherein the alignment layer comprises an imprint layer.

Example 3. The method of Example 1, wherein the liquid crystal layer comprises a nematic liquid crystal layer.

Example 4. The method of Example 1, wherein the surface relief features comprise nanostructures and the liquid crystal layer is disposed on the alignment layer such that the liquid crystal molecules align with the nanostructures.

Example 5. The method of Example 4, wherein the nanostructures comprise imprinted nanostructures.

Example 6. The method of Example 4, wherein the nanostructures comprise an optical phase and a grating period, and wherein the liquid crystal molecules are aligned by the nanostructure to include a substantially same optical phase and grating period.

Example 7. The method of Example 1, wherein the liquid crystal layer has a thickness of about d, wherein $d=\lambda/(2\Delta n)$, where $\lambda$ is the wavelength of light propagated through the optical master to the photo-alignment layer, and where $\Delta n$ is the birefringence of the liquid crystal layer.

Example 8. The method of Example 7, wherein the liquid crystal layer has an optical phase and a grating period, wherein after replicating the liquid crystal pattern, the photo-alignment layer has an optical phase of about double the optical phase of the liquid crystal layer and a grating period of about half the grating period of the liquid crystal layer.

Example 9. The method of Example 7, wherein the light comprises linearly polarized light.

Example 10. The method of Example 9, wherein the liquid crystal layer diffracts the light into left circularly polarized light and right circularly polarized light, wherein one of the circularly polarized light is −1 diffraction order light and the other of the circularly polarized light is +1 diffraction order light.

Example 11. The method of Example 10, wherein the liquid crystal layer diffracts about half the light into left circularly polarized light and half the light into right circularly polarized light.

Example 12. The method of Example 1, wherein the liquid crystal layer has a thickness of about d, wherein $d=\lambda/(4\Delta n)$, where $\lambda$ is the wavelength of light propagated through the optical master, and $\Delta n$ is the birefringence of the liquid crystal layer.

Example 13. The method of claim 12, wherein the liquid crystal layer comprises an optical phase and a grating period, wherein after replicating the liquid crystal pattern, the photo-alignment layer has an optical phase and a grating period equal to that of the liquid crystal layer.

Example 14. The method of Example 12, wherein the light comprises one of left and right circularly polarized light.

Example 15. The method of Example 14, wherein the liquid crystal layer diffracts the light into left circularly polarized light and right circularly polarized light, wherein one of the left and the right circularly polarized light is +1 or −1 diffraction order light and the other of the left and the right circularly polarized light is zero diffraction order light.

Example 16. The method of Example 15, wherein the liquid crystal layer diffracts about half the light into left circularly polarized light and the liquid crystal layer diffracts about half the light into right circularly polarized light.

Example 17. The method of Example 1, further comprising depositing a liquid crystal layer directly on the photo-alignment layer, wherein the molecules of the liquid crystal layer on the photo-alignment layer are aligned by the photo-alignment layer.

Example 18. The method of Example 1, wherein the photo-alignment layer comprises at least one of an azo, a cinnamate and/or a coumarin-based material.

Example 19. The method of Example 1, wherein propagating light through the optical master comprises positioning a collimated light source over the optical master which illuminates at least a portion of the optical master.

Example 20. The method of Example 19, wherein the collimated light source comprises a laser, a light emitting diode, or a lamp.

Example 21. The method of Example 19, wherein propagating light through the optical master further comprises moving the collimated light source to a different portion of the optical master.

Example 22. The method of Example 19, wherein the collimated light source comprises a beam power (P) and beam width (W).

Example 23. The method of Example 22, wherein the collimated light source is moved at a scanning speed (S), wherein the dose equals P*W/S, and wherein dose is between 0.5 Joules per $cm^2$ and 10 Joules per $cm^2$.

Example 24. The method of Example 23, wherein dose is between 0.5 Joules per $cm^2$ and 1 Joules per $cm^2$.

Example 25. The method of Example 22, wherein the collimated light source is moved at a scanning speed (S), wherein the scanning speed provides a total light exposure time of less than ⅙ second over any portion of the photo-alignment layer.

Example 26. A method of forming an optical master, the method comprising:

providing a first optical master comprising:

an alignment layer including surface relief features, and a first liquid crystal layer on the surface relief features, wherein liquid crystal molecules of the first liquid crystal layer define a liquid crystal pattern; forming a second optical master by:

providing a photo-alignment layer disposed on a substrate;

replicating the liquid crystal pattern in the photo-alignment layer by propagating light through the optical master to the photo-alignment layer; and depositing a second liquid crystal layer on the photo-alignment layer, wherein the molecules of the second liquid crystal layer are aligned by the photo-alignment layer, wherein the second optical master comprises the second liquid crystal layer, the photo-alignment layer, and the substrate.

Example 27. The method of Example 26, wherein the alignment layer comprises an imprint layer.

Example 28. The method of Example 26, wherein the liquid crystal layer comprises a nematic liquid crystal layer.

Example 29. The method of Example 26, wherein the surface relief features comprise nanostructures and the first liquid crystal layer is disposed on the alignment layer such that the liquid crystal molecules of the first liquid crystal layer align with the nanostructures.

Example 30. The method of Example 29, wherein the nanostructures comprise imprinted nanostructures.

Example 31. The method of Example 29, wherein the nanostructures comprise an optical phase and a grating period, and wherein the liquid crystal molecules of the first liquid crystal layer are aligned by the nanostructures to include substantially same optical phase and grating period.

Example 32. The method of Example 26, wherein the first liquid crystal layer has a thickness of about d, wherein $d=\lambda/(2\Delta n)$, where $\lambda$ is the wavelength of light propagated through the first optical master to the photo-alignment layer, and where $\Delta n$ is the birefringence of the first liquid crystal layer.

Example 33. The method of Example 32, wherein the first liquid crystal layer has an optical phase and a grating period, wherein after replicating the liquid crystal pattern, the photo-alignment layer has an optical phase of about double the optical phase of the first liquid crystal layer and a grating period of about half the grating period of the first liquid crystal layer.

Example 34. The method of Example 32, wherein the light comprises linearly polarized light.

Example 35. The method of Example 34, wherein the first liquid crystal layer diffracts the light into left circularly polarized light and right circularly polarized light, wherein one of the circularly polarized light is −1 diffraction order light and the other of the circularly polarized light is +1 diffraction order light.

Example 36. The method of Example 35, wherein the first liquid crystal layer diffracts about half the light into left circularly polarized light and half the light into right circularly polarized light.

Example 37. The method of Example 26, wherein the first liquid crystal layer has a thickness of about d, wherein d=λ/(4Δn), where λ is the wavelength of light propagated through the first optical master, and Δn is the birefringence of the first liquid crystal layer.

Example 38. The method of Example 37, wherein the first liquid crystal layer comprises an optical phase and a grating period, wherein after replicating the liquid crystal pattern, the photo-alignment layer has an optical phase and a grating period equal to that of the first liquid crystal layer.

Example 39. The method of Example 37, wherein the light comprises one of left and right circularly polarized light.

Example 40. The method of Example 39, wherein the first liquid crystal layer diffracts the light into left circularly polarized light and right circularly polarized light, wherein one of the left and the right circularly polarized light is +1 or −1 diffraction order light and the other of the left and the right circularly polarized light is zero diffraction order light.

Example 41. The method of Example 40, wherein the first liquid crystal layer diffracts about half the light into left circularly polarized light and the liquid crystal layer diffracts about half the light into right circularly polarized light.

Example 42. The method of Example 26, wherein the photo-alignment layer comprises at least one of an azo, a cinnamate and/or a coumarin-based material.

Example 43. The method of Example 26, wherein propagating light through the first optical master comprises positioning a collimated light source over the first optical master which illuminates at least a portion of the first optical master.

Example 44. The method of Example 43, wherein the collimated light source comprises a laser, a light emitting diode, or a lamp.

Example 45. The method of Example 43, wherein propagating light through the first optical master further comprises moving the collimated light source to a different portion of the first optical master.

Example 46. The method of Example 43, wherein the collimated light source comprises a beam power (P) and beam width (W).

Example 47. The method of Example 46, wherein the collimated light source is moved at a scanning speed (S), wherein the dose equals P*W/S, and wherein the dose is between 0.5 Joules per cm$^2$ and 10 Joules per cm$^2$.

Example 48. The method of Example 47, wherein dose is between 0.5 Joules per cm$^2$ and 1 Joules per cm$^2$.

Example 49. The method of Example 47, wherein the scanning speed provides a total light exposure time of less than ⅙ second over any portion of the photo-alignment layer.

Example 50. A method of forming a patterned liquid crystal layer using a replica optical master, the method comprising:

providing a first optical master comprising:

an alignment layer including surface relief features, and a first liquid crystal layer on the surface relief features, wherein liquid crystal molecules of the first liquid crystal layer define a liquid crystal pattern; providing a photo-alignment layer disposed on a substrate;

forming a second optical master by:

replicating the liquid crystal pattern in the photo-alignment layer by propagating light through the optical master to the photo-alignment layer; and depositing a second liquid crystal layer on the photo-alignment layer, wherein the molecules of the second liquid crystal layer are aligned by the photo-alignment layer, wherein the second optical master comprises the second liquid crystal layer, the photo-alignment layer, and the substrate;

providing a second photo-alignment layer on a second substrate;

positioning the second optical master over the second photo-alignment layer; and replicating the liquid crystal pattern in the second photo-alignment layer by propagating light through the second optical master to the second photo-alignment layer.

Example 51. The method of Example 50, further comprising depositing a third liquid crystal layer onto the second photo-alignment layer, wherein the molecules of the third liquid crystal layer are aligned by the second photo-alignment layer.

Example 52. A method forming a patterned liquid crystal layer, the method comprising:

providing an optical master comprising:

an alignment layer, and a liquid crystal layer on the alignment layer, wherein liquid crystal molecules of the liquid crystal layer define a liquid crystal pattern;

providing a photo-alignment layer disposed on a substrate; and propagating light through the optical master to the photo-alignment layer to replicate the liquid crystal pattern in the photo-alignment layer by moving a collimated light source across the optical master.

Example 53. The method of Example 52, wherein propagating light through the optical master comprises positioning the collimated light source over the optical master which illuminates at least a portion of the optical master.

Example 54. The method of Example 53, wherein propagating light through the optical master further comprises moving the collimated light source to a different portion of the optical master.

Example 55. The method of Example 52, wherein the collimated light source comprises a laser, a light emitting diode, or a lamp.

Example 56. The method of Example 52, wherein the collimated light source comprises a beam power (P) and beam width (W).

Example 57. The method of Example 56, wherein the collimated light source is moved at a scanning speed (S), wherein the dose equals P*W/S, and herein dose is between 0.5 Joules per cm$^2$ and 10 Joules per cm$^2$.

Example 58. The method of Example 57, wherein dose is between 0.5 Joules per cm$^2$ and 1 Joules per cm$^2$.

Example 59. The method of Example 57, wherein the scanning speed provides a total light exposure time of less than ⅙ second over any portion of the photo-alignment layer.

Example 60. The method of Example 52, wherein propagating light through the optical master comprises positioning multiple collimated light sources over the optical master which illuminate a portion of the optical master.

Example 61. The method of Example 60, wherein propagating light through the optical master further comprises moving the multiple collimated light source to illuminate a different portion of the optical master.

Example 62. The method of Example 60, wherein each of the multiple collimated light sources comprises a laser, a light emitting diode, or a lamp.

DETAILED DESCRIPTION

Figure 1A:
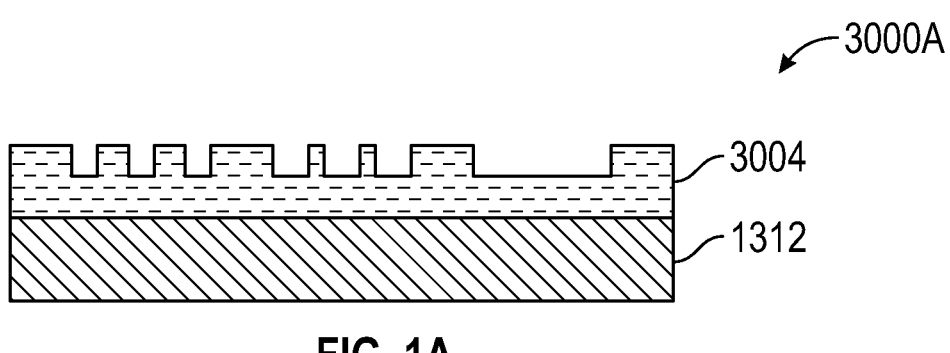
FIG. 1a is a cross-sectional sideview of an example of surface relief features for forming optical masters according to some implementations of the present disclosure.

Geometric Phase Holograms (GPHs) may be used for various applications such as lenses and polarization conversion systems. The GPHs may be formed by three-dimensional patterns of liquid crystal molecules. Examples of GPHs are disclosed in U.S. Patent Publication No. 2019/0227375, the entire disclosure of which is incorporated herein by reference.

One approach for making GPHs involves the use of a photo-alignment material that is optically patterned. A liquid crystal layer is deposited on the patterned photo-alignment material, which aligns the liquid crystal molecules within the liquid crystal layer based on interactions between the liquid crystal molecules and the pattern within the photo-alignment material. Patterning the photo-alignment material may involve the use of two beams of collimated light, complex optics, highly coherent light sources, and strict mechanical stability (e.g., a high level of vibration isolation). As a result, the formation of GPHs, particularly GPHs extending across large areas, may require undesirably complex and highly constrained systems and may occur with low throughput.

Advantageously, in some implementations, methods and systems are provided for forming GPHs with relaxed manufacturing constraints and high throughput. In addition, the methods and systems may utilize easily created optical masters which may be formed with high precision and which facilitate the replication of "sub" masters. Both the masters and sub-masters may be utilized to pattern photo-alignment layers, which in turn may be utilized to align liquid crystal molecules. Thus, in some implementations, easily-formed and easily-replicated optical masters may be utilized to form GPHs using a system with relaxed manufacturing constraints and high throughput over a large area.

In some implementations, the optical masters include surface relief features and an overlying liquid crystal layer, which preferably is in contact with the surface relief features. The surface relief features may be sized, shaped, and formed of an appropriate material to cause liquid crystal molecules within the liquid crystal layer to align with those surface relief features. In some implementations, the surface relief features may be imprinted nanostructures. In some implementations, the surface relief features form a pattern and the liquid crystal molecules may align to assume the same pattern. Advantageously, forming surface relief features by imprinting may more easily provide high precision and high reproducibility in comparison to forming an optical master using multiple beams of light.

It will be appreciated that after being aligned to form a particular pattern, liquid crystal molecules may be polymerized (by, e.g., application of heat and/or irradiation with light such as by UV illumination). Upon being polymerized, the individual liquid crystal molecules retain their orientations relative to one another, although they are linked (e.g., covalently bonded) upon being polymerized. For ease of description herein, and as will be clear from context, the term liquid crystal molecules may refer both to discrete unlinked liquid crystal molecules, and also to those same liquid crystal molecules after being linked; that is, the term liquid crystal molecule may refer to the corresponding portion of a larger linked network of liquid crystal material that are formed by a previously unlinked liquid crystal molecule.

In some implementations, optically patterning a photo-alignment layer formed of a photo-alignment material involves illuminating the optical master, so that light propagates through the optical master to the photo-alignment material to pattern the photo-alignment material. The light passing through the optical master is diffracted, forming two beams of light which then impinge on the photo-alignment layer. Without being limited by theory, interference between the two beams of light within the photo-alignment layer is believed to form a pattern in that photo-alignment layer which causes alignment of an overlying layer of liquid crystal molecules, such that the liquid crystal molecules assume a desired pattern. This desired pattern preferably substantially replicates the pattern of liquid crystal molecules in the optical master.

It has been found that the thickness of the liquid crystal layer of the optical master may influence the diffraction of the light illuminating the optical master. Advantageously, by appropriately selecting the thickness of the liquid crystal layer, the pitch of features in the replicated liquid crystal pattern may be modified. In some implementations, this allows optical masters with easily-formed large pitch features to provide replicated liquid crystal patterns having half the pitch of the optical master liquid crystal pattern. In some other implementations, the thickness of the optical master liquid crystal layer may be selected such that the replicated liquid crystal pattern and the optical master liquid crystal pattern have substantially the same pitch, which may be advantageous when replicating patterns which involve significant amounts of zero diffraction order light, as discussed herein.

In some implementations, propagating light through the optical master to pattern a target photo-alignment layer may comprise illuminating all of the optical master that corresponds to the entirety of a target photo-alignment layer, such that light propagates through the optical master to simultaneously impinge on the entirety of the target photo-alignment layer. Such a scheme, however, undesirably requires a large collimated beam of light, which may entail complex optics, and a high level of vibration isolation. In some implementations, rather than illuminating the entirety of the target photo-alignment layer, a beam of light is moved relative to the photo-alignment layer such that only one or more portions of the photo-alignment layer receive incident light at any given time. For example, the incident light may be scanned and/or stepped across the photo-alignment layer, and/or the photo-alignment layer may be moved relative to the incident light. Advantageously using a narrow beam of light relaxes requirements for the incident beam, and relative movement between the incident light and the photo-alignment layer reduces the susceptibility of pattern-forming processes to vibration. For example, the speed of the light movement (e.g., the speed at which a beam of incident light is moved across the photo-alignment layer) is preferably greater than the speed of expected vibrations to a manufacturing system, to reduce the impact of any such vibrations.

The resulting structure, having the patterned photo-alignment layer and the liquid crystal layer having a pattern replicating the liquid crystal pattern of the optical master, may be utilized as a sub-master to form other GPHs in some implementations. In some other implementations, the resulting structure may form an optical structure which may be integrated in an optical device, such as a display. For example, the resulting structure may be utilized as part of optics associated with in-coupling optical elements and/or out-coupling optical elements in one or more waveguides forming an eyepiece for a head-mounted display. Alternatively, the resulting structure may be an entirely separate layer used for imaging portions of or within the eye as part of an eye-tracking system. For example, the GPH may be used as a mirror to provide an eye-tracking camera with a view of the eye. Examples of eye-tracking systems are disclosed in U.S. Patent Publication No. US 2018/0164627, the entire disclosure of which is incorporated herein by reference.

Reference will now be made to the drawings, in which like reference numerals refer to like parts throughout.

FIG. 1a is a cross-sectional sideview of an example of surface relief features for forming optical masters, according to some implementations.

Referring to the intermediate structure 3000A of FIG. 1a, an optically transmissive (e.g., transparent) substrate 1312 is provided. A layer of imprint resist (e.g., a polymer layer) may be deposited on the substrate 1312, and then imprinted with a pattern to form the imprint layer 3004 of the intermediate structure 3000A.

It will be appreciated that the layer 3004 may be imprinted with a pattern by bringing that layer 3004 into contact with a nanoimprint template (not shown) having a negative of the desired pattern for the layer 3004. The nanoimprint template may have predefined topological features configured to form an alignment pattern for LC molecules in the subsequently formed LC layer 2704 (FIG. 1b), e.g., for at least the bottommost LC molecules in the LC layer 2704 closest to the substrate 1312. Subsequently, the template may be pressed into the imprint resist layer. In some implementations, the imprint resist layer may include a thermoplastic polymer under certain temperature, e.g., above the glass transition temperature of the polymer, thereby transferring the pattern of the template into the softened resist layer to form an imprint layer 3004, After being cooled down, the template is separated from the imprint layer 3004, which then has an alignment pattern having predefined topological patterns including surface relief features configured to align LC molecules in the subsequently formed LC layer 2704 (FIG. 1b), In some other implementations, after being pressed into the base polymer layer, the alignment layer 3004 is hardened by crosslinking under UV light.

In some other implementations, the imprint resist may be deposited onto a nanoimprint mold (not shown) having a negative of the desired pattern. The imprint resist may subsequently be hardened and the mold may be removed after hardening the imprint resist. The substrate 1312 may be attached to the imprint layer 3004 before removing the mold.

In some implementations, the imprint resist may be deposited by jet deposition, e.g., by dispensing imprint resist out of one or more nozzles. Such a jet deposition allows for the formation of an imprint layer having different resist compositions in different locations, which may have advantages for forming different surface relief patterns in different areas and/or for providing an imprint layer with different materials properties in different locations.

The alignment layer 3004 may include features that are sub-wavelength in one or more dimensions (e.g., the one or more dimensions are less than the wavelength of light expected to be incident on the features). For example, the alignment layer 3004 may include features having dimensions (e.g., length, width and/or depth) of the order of a few nanometers, a few hundred nanometers and/or a few microns. As another example, the alignment layer 3004 may include features having a length greater than or equal to about 20 nm and less than or equal to about 100 nm. As yet another example, the alignment layer 3004 may include features having a width greater than or equal to about 20 nm and less than or equal to about 100 nm. As yet another example, the alignment layer 3004 may include features having a depth greater than or equal to about 10 nm and less than or equal to about 100 nm. In various implementations, the length and/or width of the features may be greater than the depth of the features. However, in some implementations, the depth may be approximately equal to the length and/or width of the features. The features of each domain of the alignment layer 3004 may be arranged to form complex geometric patterns within each domain in which the direction and/or the period between consecutive features changes along length scales of the order of a few nanometers, a few hundred nanometers and/or a few microns.

While an example process of nanoimprinting was described for forming the alignment layer 3004 with respect to FIG. 1a, implementations are not so limited. In some other implementations, the alignment layer 3004 may be fabricated using other patterning techniques including lithography and etch. In addition, while the alignment layer 3004 was described as being formed of a polymeric material, implementations are not so limited and in various other implementations, the alignment layer 3004 may comprise a dielectric material, e.g., silicon or a glass material.

Figure 1B:
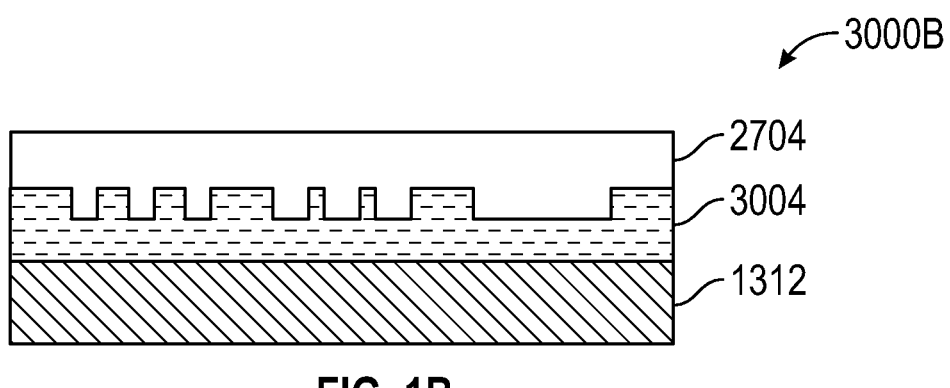
FIG. 1b is a cross-sectional sideview of an example of an optical master according to some implementations of the present disclosure.

With reference now to FIG. 1b, a cross-sectional sideview of an example of an optical master according to some implementations as illustrated. After forming the alignment layer 3004, an unpolymerized LC layer 2704, e.g., a layer of reactive mesogens, is deposited thereon. Without being bound to any theory, the alignment layer 3004 serves as an alignment layer that causes the LC molecules of the LC layer 2704 to align according to the pattern of the alignment layer 3004. For example, the elongation direction of LC molecules within a domain may generally align in a direction parallel to the local elongation direction of the nanostructures in the alignment layer 3004. Without being bound to any theory, the alignment of the LC molecules to the pattern of the alignment layer 3004 may be attributed to steric interactions with the liquid crystal molecules, and/or anchoring energy exerted on deposited LC molecules by the alignment layer 3004. Still referring to the intermediate structure 3000B of FIG. 1b, the LC layer 2704 may be further processed according to different implementations. For example, the liquid crystal molecules of the LC layer 2704 may be polymerized, and/or multiple LC layers may be stacked, such that the LC layer 2704 has a plurality of constituent LC sub layers. The resulting structure may be understood to be an optical master.

In some implementations, the optical master may be used to pattern a photo-alignment layer. In these implementations, the optical master includes a liquid crystal pattern which may diffract light. The optical master may be placed in front of a photo-alignment layer, which may be supported on a substrate. The optical master may be illuminated such that incident light propagating through the optical master is diffracted by the pattern. The diffracted light may be used to illuminate the photo-alignment layer, thus exposing and patterning the photo-alignment layer. This will be further discussed regarding FIGS. 3b and 4b.

Figures 2A, 2B:
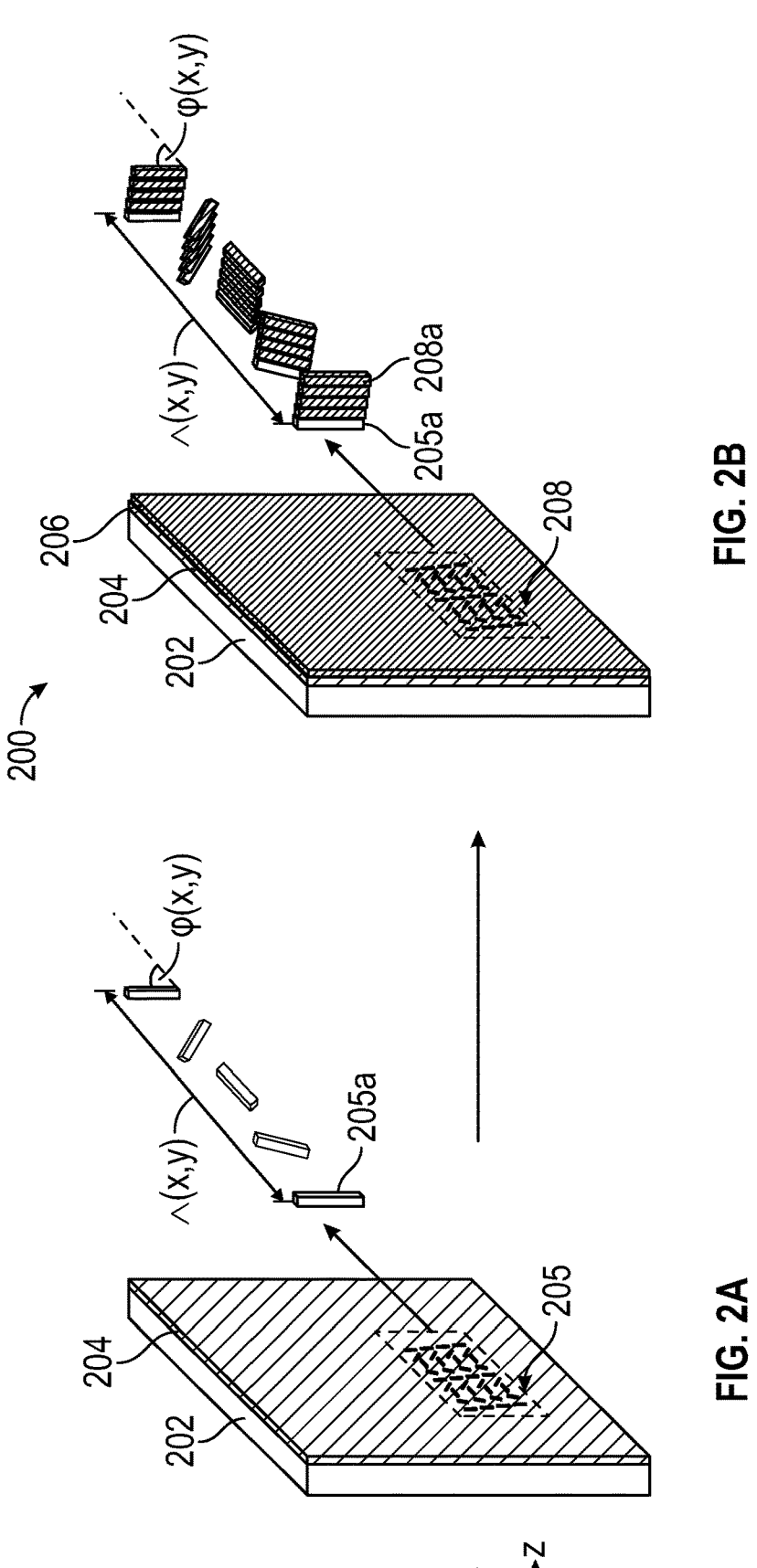
FIGS. 2a and 2b are perspective views of the surface relief features and optical master of FIGS. 1a and 1b, respectively.

With reference now to FIGS. 2a and 2b perspective views are illustrated of the surface relief features and optical master of FIGS. 1a and 1b, respectively. A substrate 202 (corresponding to the substrate 1312 of FIGS. 1a and 1b) includes an alignment layer 204 (corresponding to the alignment layer 3004 of FIGS. 1a and 1b) which includes surface relief pattern 205. As illustrated, the surface relief pattern 205 may include surface relief features 205a with a certain grating period Λ (x,y) and optical phase φ (x,y) which may create a certain diffraction pattern. As further illustrated, a liquid crystal layer 206 (corresponding to the liquid crystal layer 2704 of FIGS. 1a and 1b) is disposed on the on the surface relief pattern 205 such that the surface relief features 205a align the liquid crystal molecules of the liquid crystal layer 206 to form pattern 208 within the liquid crystal layer 206. The pattern 208 is based on the alignment of the liquid crystal molecules 208a, which are aligned by surface relief features 205a. The pattern 208 includes the same grating period Λ (x,y) and optical phase φ (x,y) as that of the surface relief pattern 205.

In some implementations, the pattern 208 within the liquid crystal layer 206 creates GPHs. In some implementations, the liquid crystal layer 206 may be a nematic liquid crystal layer.

Figure 3B:
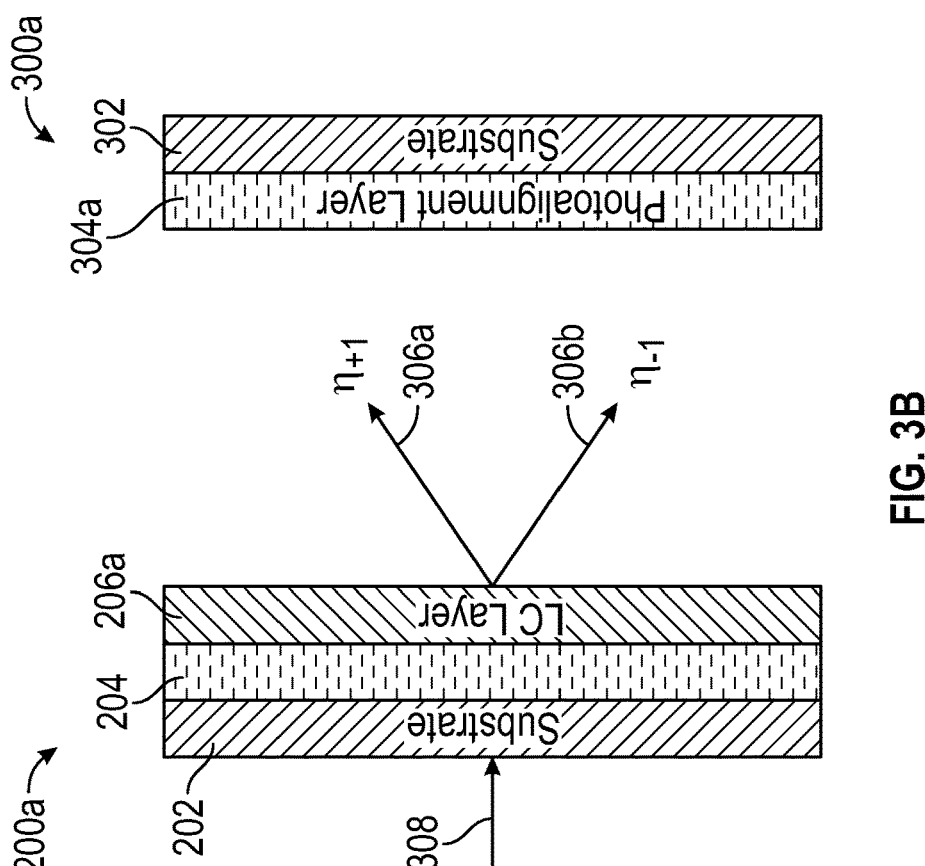
FIG. 3b is a cross-sectional sideview of an example of light propagating through the optical master of FIG. 3a to replicate a pattern in a photoalignment layer according to some implementations of the present disclosure.
Figure 3A:
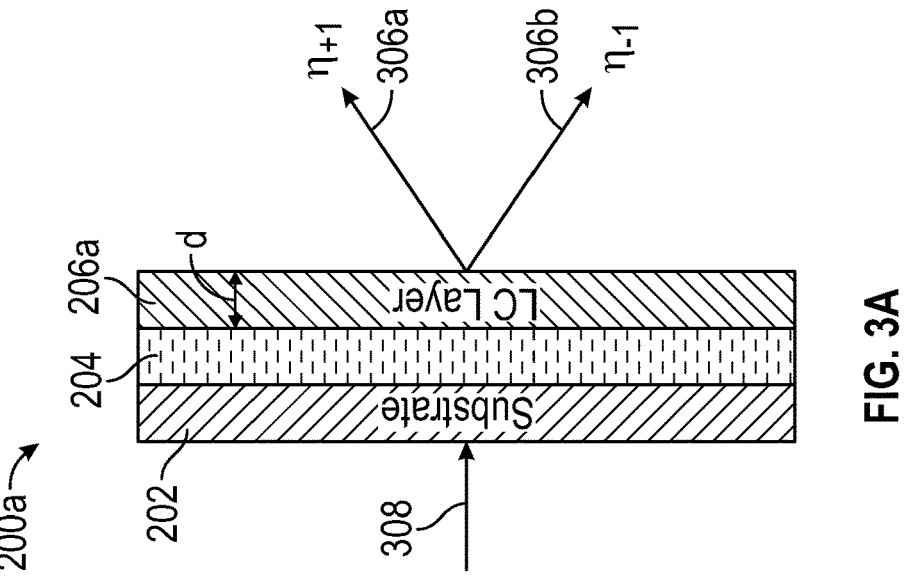
FIG. 3a is a cross-sectional sideview of an example of an optical master according to some implementations of the present disclosure.

With reference now to FIG. 3a, a cross-sectional sideview of an example of an optical master 200a is illustrated. The optical master 200a includes the substrate 202 and the alignment layer 204. The details of the shared features from FIGS. 2a and 2b will not be repeated in detail. FIG. 3a further includes a liquid crystal layer 206a which is similar to the layer 206 and which is understood to have a liquid crystal pattern (not shown) similar to the pattern 208 (FIG. 2b). The liquid crystal layer has birefringence Δn and approximate thickness d, which may vary depending on the light illuminating the optical master 200a. The light 308 illuminating the optical master has a wavelength λ. Equation 1 may be used to determine the approximate thickness d of the liquid crystal layer 206b depending on the liquid crystal birefringence Δn and the wavelength λ of the light illuminating the optical master 200a. Preferably, in some implementations, the thickness of the liquid crystal layer 206a is within ±5% of the value of d provided by Equation 1.

$$d = \lambda/(2\Delta n) \qquad \text{Equation 1:}$$

When Equation 1 is met and the light 308 has wavelength λ, the pattern 208 within the liquid crystal layer 206a diffracts linearly polarized light 308 into left circular polarized light and right circular polarized light. One of the circular polarized light is −1 diffraction order light 306b and the other of the circular polarized light is +1 diffraction order light 306a depending on the polarization of the light 308 illuminating the optical master 200a. When the light 308 is linearly polarized light, −1 diffraction order light 306b may be right hand circular polarized light and the +1 diffraction order light 306a may be left hand circular polarized light. Alternatively, this may be switched depending on the orientation of the pattern 208 such that the −1 diffraction order light 306b may be left hand circular polarized light and the +1 diffraction order light 306a may be right hand circular polarized light.

FIG. 3b illustrates a cross-sectional view of the optical master 200a of FIG. 3a and a replica photoalignment structure 300a. The replica structure 300a includes a photo-alignment layer 304a which is disposed on a substrate 302. The photo-alignment layer 304a is between the optical master 200a and the substrate 302. As discussed above in the discussion of FIG. 3a, when the optical master 200a is illuminated with light 308 of wavelength k, the light diffracts into one of left or right circular polarized light that is −1 diffraction order light 306b and into one of right or left circular polarized light that is +1 diffraction order light 306a. It is understood that the about half the light is diffracted into −1 diffraction order light 306b and about half the light is diffracted into +1 diffraction order light 306*a*. The liquid crystal layer 206*a* includes a pattern 208 and the −1 diffraction order light 306*b* and the +1 diffraction order light 306*a* will also cause the pattern 208 to be replicated in the photo alignment layer 304*a*. As discussed herein, the pattern 208 includes a grating period Λ (x,y) and an optical phase φ (x,y). When the light is diffracted into −1 diffraction order light 306*b* and the +1 diffraction order light 306*a*, it has been found that the grating period is half of that of the pattern 208 and the optical phase is double that of the pattern 208. In other words, the grating period of replicated pattern in the photo-alignment layer 304*a* is equal to 0.5*Λ (x,y) and the optical phase of the replicated pattern in the photo-alignment layer 304*a* is equal to 2φ (x,y). Advantageously, because the grating period or pitch of the photo-alignment layer 304*a* is half the size of the grating period or pitch of the pattern 208, the feature size of the pattern 208 may be twice as large as the size the replicated feature within the photo-alignment layer 304*a*. It is understood that smaller nanostructures included within the surface relief features may be more difficult to achieve and therefore, it may be beneficial to utilize larger surface relief features to form relatively small replicated features in the photo alignment layer 304*a*.

In some implementations, the photo-alignment layer 304*a* may include one of an azo, cinnamate, and/or coumarin based material. In some implementations, the light 308 may be a substantially collimated light produced by a collimated light source such as one or more lasers, light emitting diodes (LEDs) or lamps. The separation distance between the liquid crystal layer 206*a* and the photo alignment layer 304*a* may be small (e.g., on the order of 10's of μm to 100's of μm, and less than 1 mm). Preferably, the light source provides a spatial coherence length that is greater than the separation between the liquid crystal layer 206*a* and the photo alignment layer 304*a*. Thus, the ability to closely space the liquid crystal layer 206*a* of the optical master and the photo alignment layer 304*a* reduces the need to have a long spatial coherence length, which advantageously reduces demands on the light source.

Figure 4B:
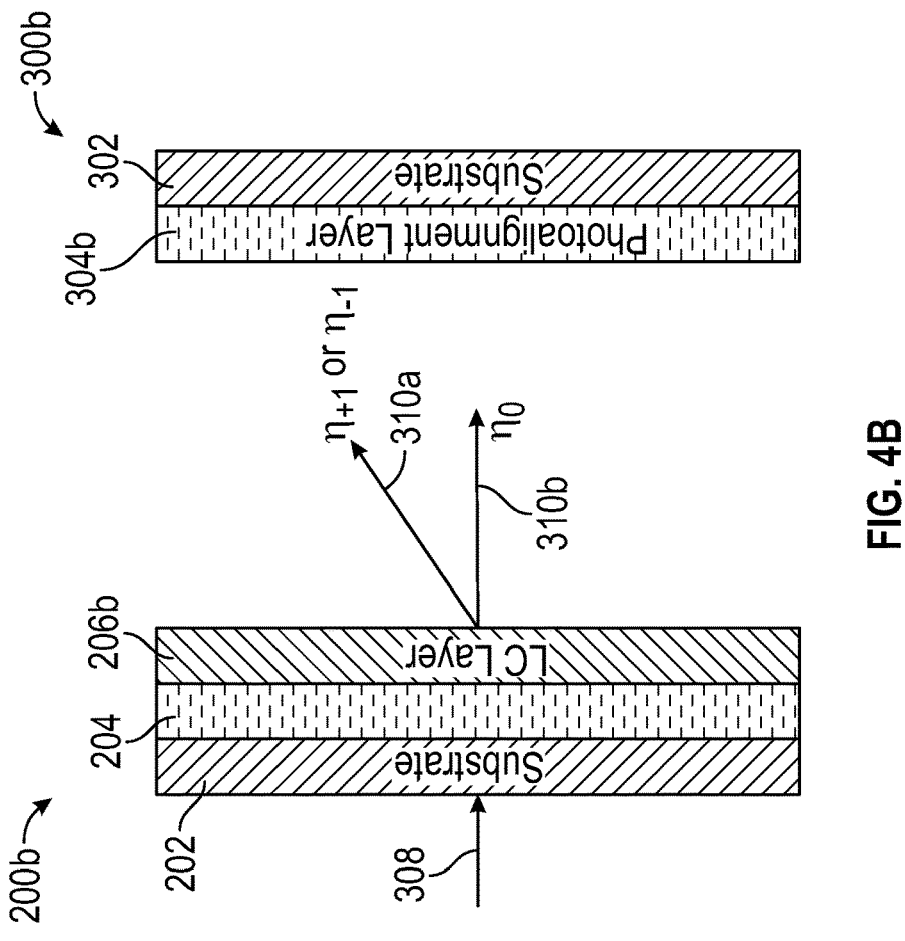
FIG. 4b is a cross-sectional sideview of an example of light propagating through the optical master of FIG. 4a to replicate a pattern in a photoalignment layer according to some implementations of the present disclosure.
Figure 4A:
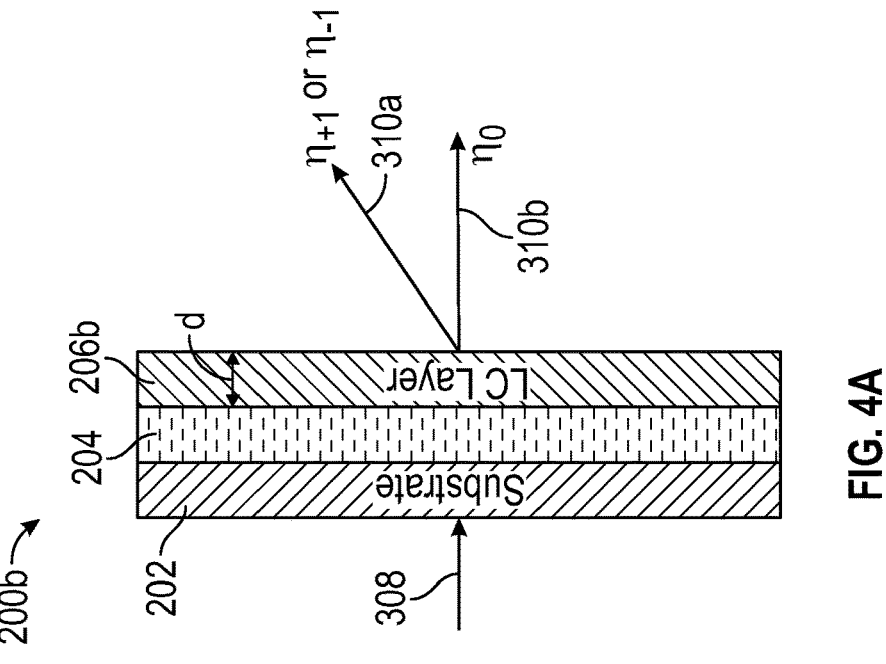
FIG. 4a is a cross-sectional sideview of an example of an optical master according to some implementations of the present disclosure.

With reference now to FIG. 4*a*, a cross-sectional sideview of an example of an optical master 200*b* according to some other implementations as illustrated. The optical master 200*b* shares various features with the optical masters 200, 200*a* of FIGS. 2*b* and 3*a*-3*b* and these features will not be repeated in detail. With continued reference to FIG. 4*a*, optical master 200*b* includes a liquid crystal layer 206*b* which has a pattern (not shown) corresponding to the pattern 208 (FIG. 2*b*). The liquid crystal layer 206*b* has birefringence Δn and approximate thickness d, which depends on the light illuminating the optical master 200*b*. The liquid crystal layer 206*b* is similar to the liquid crystal layer 206*a* except the approximate thickness of liquid crystal layer 206*b* depends on Equation 2 rather than Equation 1. Preferably, in some implementations, the thickness of the liquid crystal layer 206*b* is within ±5% of the value of d provided by Equation 2.

$$d=\lambda/(4\Delta n) \qquad \text{Equation 2:}$$

When Equation 2 is met and the circularly polarized light 308 has wavelength λ, the light is diffracted by the pattern 208 within the liquid crystal layer 206*b* into left circular polarized light and right circular polarized light. One of the left and the right circular polarized light is +1 or −1 diffraction order light and the other of the left and the right circularly polarized light is zero diffraction order light. The incident light 208 may be either left hand circular polarized light or right hand circular polarized light. When the light

208 is left hand circular polarized light, the +1 or −1 diffraction order light 310*a* is right hand circular polarization and the zero diffraction order light is left hand circular polarized light. When the light 208 is right hand circular polarized light, the +1 or −1 diffraction order light 310 is left hand circular polarized and the zero diffraction order light is right hand circular polarized. Further, it is understood that the about half the light is diffracted into +1 or −1 diffraction order light 310*a* and about half the light is diffracted into zero diffraction order light 310*b*

FIG. 4*b* illustrates a cross-sectional view of the optical master 200*b* of FIG. 4*a* and a replica photoalignment structure 300*b*. The replica structure 300*b* includes a photo-alignment layer 304*b* which is disposed on a substrate 302. The photo-alignment layer 304*a* is between the optical master 200*a* and the substrate 302. As discussed above regarding FIG. 4*a*, when the optical master 200*a* is illuminated with light 308 of wavelength k, the light diffracts into one of left or right circular polarized light that is −1 or +1 diffraction order light 310*a* and into one of right or left circular polarized light that is zero diffraction order light 310*b*. It is understood that the about half the light is diffracted into −1 or +1 diffraction order light 310*a* and about half the light is diffracted into zero diffraction order light 310*b*. The liquid crystal layer 206*b* includes a pattern 208 and the −1 or +1 diffraction order light 310*a* and the zero diffraction order light 310*b* will replicate the pattern 208 in the photo-alignment layer 304*b*. Thus, the −1 or +1 diffraction order light 310*a* and the zero diffraction order light 310*b* will replicate the pattern 208 in the photo-alignment layer 304*b*.

As discussed above, the pattern 208 includes features with a grating period Λ (x,y) and an optical phase φ (x,y). When the light is diffracted into −1 or +1 diffraction order light 310*a* and the zero diffraction order light 310*b*, it has been found that the grating period and the optical phase of the pattern 308 are the same as that of the pattern 208. In other words, the grating period of replicated pattern on the photo-alignment layer 304*b* will be equal to Λ (x,y) and the optical phase of the replicated pattern on the photo-alignment layer 304*b* will be equal to φ (x,y). The feature size of pattern 208 will be approximately equal to the replicated feature within the photo-alignment layer 304*b*. Thus, there is no reduction in the pitch of features of the replicated pattern on the photo-alignment layer 304*b*. However, has been found that the optical master 200*a* in FIG. 3*b* may have leakage of zero diffraction order light, and such leakage may be pronounced when feature sizes are small. Thus, for small feature sizes, it may advantageous to use the optical master 200*b*, which already assumes the presence of zero diffraction order light 310*b*.

Figure 5:
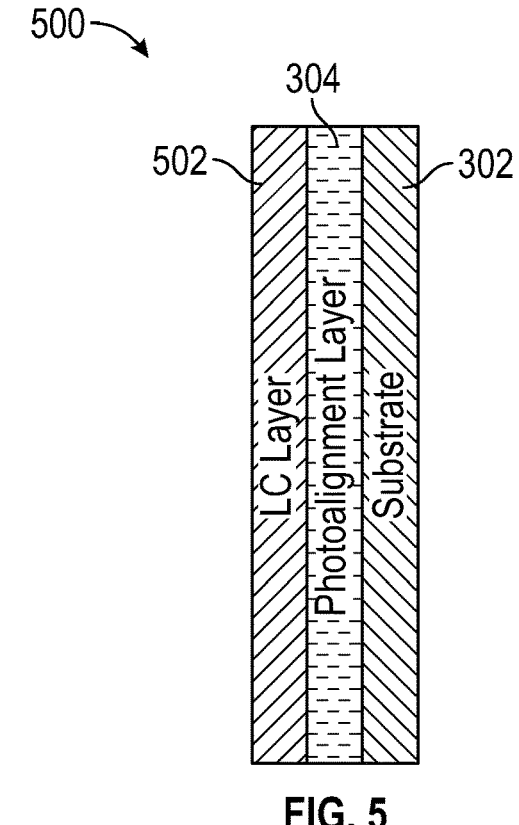
FIG. 5 is a cross-sectional sideview of an example of a structure with a replica liquid crystal pattern according to some implementations of the present disclosure.

With reference now to FIG. 5, a cross-sectional sideview of an example of a structure with a replica liquid crystal pattern is illustrated. The replica structure 500 includes a liquid crystal layer 502, a photo-alignment layer 304, and a substrate 302. The replica structure 500 shares various features with the replica structures 300*a*, 300*b* of FIGS. 4*a* and 4*b* and these overlapping features will not be repeated in detail. The photo-alignment layer 304 may be the photo-alignment layer 304*a* of FIG. 3*b* or the photo-alignment layer 304*b* of FIG. 4*b*. The liquid crystal layer 502 may be deposited onto the photo-alignment layer 304 which aligns the liquid crystal molecules within the liquid crystal layer 502 based on the pattern within the photo-alignment layer 304. In some implementations, the liquid crystal layer 502 may be formed of nematic liquid crystal or cholesteric liquid crystal.

In some implementations, the replica structure 500 may be used as a replica optical master, or a "sub" master, to replicate the pattern of its liquid crystal layer in other photo-alignment layers. When the replica structure 500 is used as a replica optical master, the liquid crystal layer 502 may be aligned by the photo-alignment layer 304 as described herein.

The replica structure 500 may be utilized to replicate the pattern of its photo-alignment layer 304 in a second photo-alignment layer (not shown), which may be disposed on a second substrate. The replica optical master 500 may be positioned such that the second photo-alignment layer (not shown) is between the replica optical master 500 and the second substrate. The second optical master 500 is illuminated with light to replicate the pattern in the liquid crystal layer 502 in the second photo-alignment layer. Further, another liquid crystal layer may be deposited onto the second photo-alignment layer to align the molecules of the other liquid crystal layer with the second photo-alignment layer.

Figure 6:
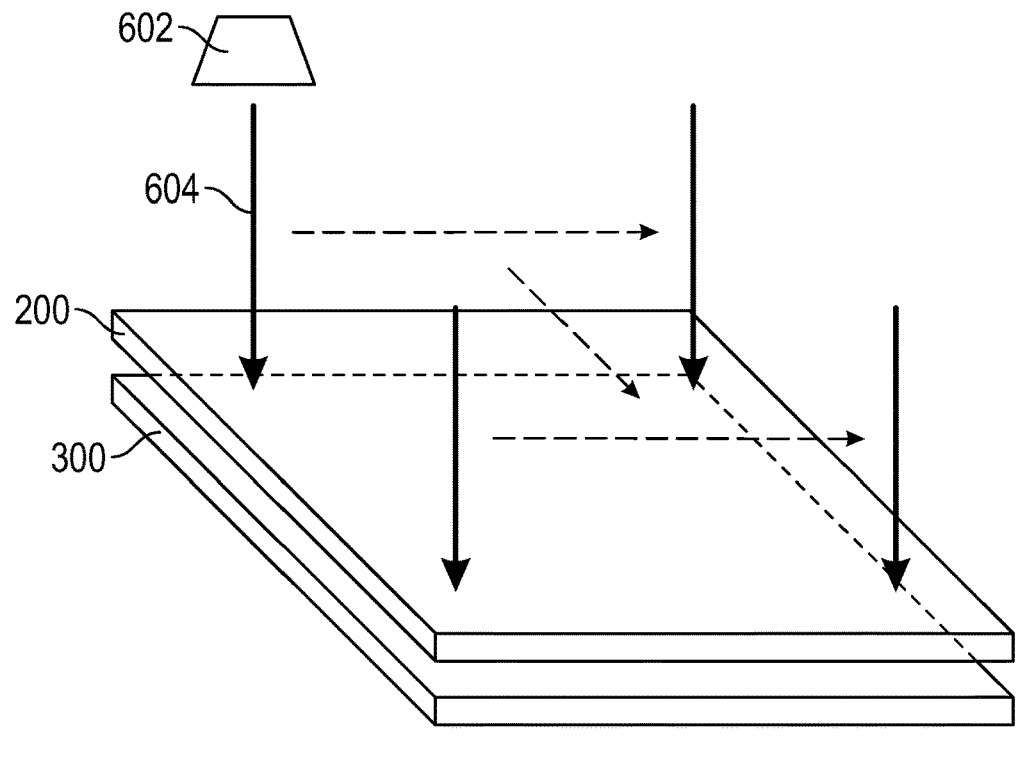
FIG. 6 is a perspective view of an example of a system for forming a replica liquid crystal pattern according to some implementations of the present disclosure.

With reference now to FIG. 6, a perspective view is illustrated of an example of a system for forming a replica liquid crystal pattern. In some implementations, an optical master 200 may correspond to the optical master 200a, 200b described above in FIGS. 2a-4. In some implementations, the replica structure 300 may correspond to the replica structure 300a, 300b described in FIGS. 3b and 4b; the replica structure 300 may include a photo-alignment layer supported on a substrate and is the structure in which the liquid crystal pattern of the optical master 200 is replicated by propagation of light from the optical master 200 to the photo-alignment layer. The illumination system also includes a light source 602 which may be the collimated light source described regarding FIGS. 3a, 3b, 4a, and 4b. The light source 602 may output light 604 which may be the light 308 of FIGS. 3a, 3b, 4a, and 4b. In some implementations, the light source 602 may include an actuator configured to move the light output aperture of the light source 600 relative to the optical master 200. In some other implementations, the optical master 200 and replica structure 300 may be coupled to an actuator (e.g., may rest on a surface attached to the actuator) which moves the optical master 200 and replica structure 300 relative to the light output aperture of the light source 602. In some other implementations, both the light source 602 and the optical master 200 and replica structure 300 may have associated actuators configured to provide relative movement of the light source 602 with the optical master 200 and replica structure 300.

The light source 602 may scan the surface of the optical master 200 in order to expose photo alignment layer of the replica structure 300 to light diffracted by the optical master 200. The light source 602 may scan the entire surface of the optical master 200 or may also selectively scan the surface of the optical master 200 where a pattern 208 is located. It is appreciated that a smaller light source 602 may be used when the light source scans as opposed to a large light source that illuminates the entire surface of the optical master 200 without scanning. Advantageously, a smaller light source may be of lower cost and energy usage than a larger light source, and may be less demanding of optical properties such as coherence and culmination than a larger light source. As shown in FIG. 6, the light source 602 may scan the surface of the optical master 200 in both the vertical and the horizontal directions. Further, the light source 602 may be multiple light sources which may each illuminate a different portion of the optical master 300. The multiple light sources may scan and illuminate different portions of the optical master.

With continued reference to FIG. 6, in some implementations, the scanning may be line scanning or beam scanning. In some implementations, the light source 602 may provide a line of light that extends substantially across a width or length of the photo-alignment layer of the replica structure 300 to provide line scanning. In some other implementations, the light source 602 may provide a discrete beam of light that extends over an area that is less than an entire width or length of photo-alignment layer of the replica structure 300.

In some implementations, the light source 602 moves continuously relative to the replica structure 300. For example, in some implementations, the light source 602 may move smoothly at a constant velocity and raster different portions of the optical master 300. Alternatively, relative movement of the light source 602 and replica structure 300 may be stepped and therefore turned off and on while moving to different portions of the optical master 300.

Figures 7A, 7B:
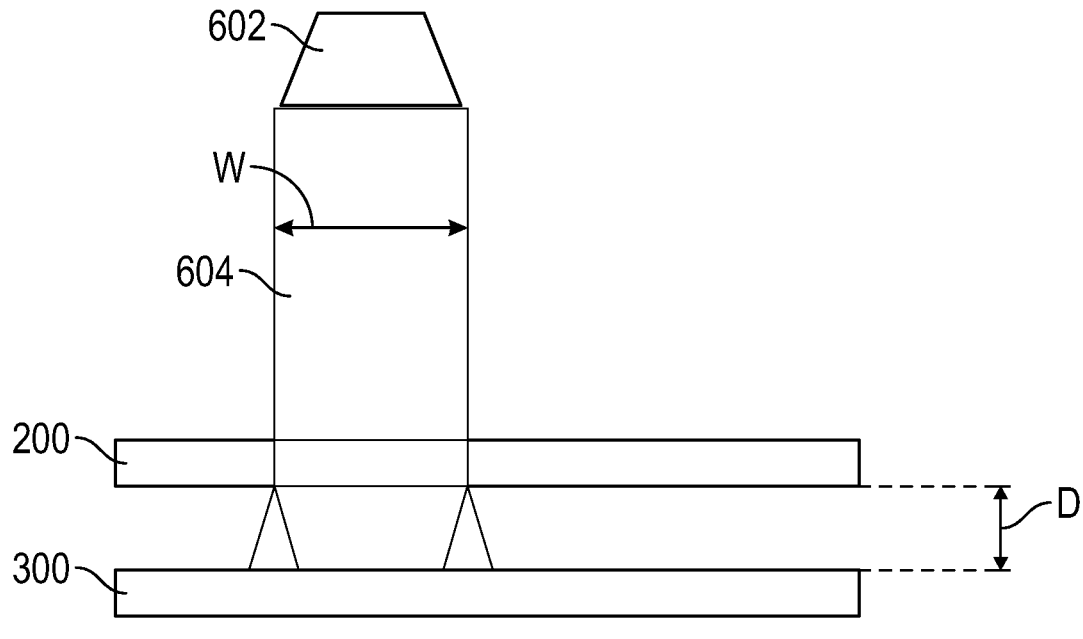
FIG. 7a is a schematic sideview of the system of FIG. 6.
FIG. 7b is a schematic top-down view of various beam positions of the light outputted by the system of FIGS. 6 and 7a according to some implementations of the present disclosure.

With reference now to FIG. 7a, a schematic sideview of the system of FIG. 6 is illustrated. The overlapping features of FIG. 7a and FIG. 6 will not be repeated in detail. FIG. 7a further illustrates that the light 604 from the light source 602 has a beam width W. Further, the optical master 200 and the replica structure 300 are separated by a distance D. The light 604 has a beam power P. In some implementations, the system scans the light 604 it is moved at a speed of scanning S across the replica structure 300. Accordingly, a light dose on a portion of the replica structure 300 may be understood to equal P*W/S and exposure time equals W/S.

In order to reduce the effects of environmental noise such as vibrations that may occurs during exposure, the scanning speed is preferably fast and the exposure time is preferably short; the speed of scanning is fast while still maintaining an adequate dose to properly expose the replica structure 300. In some implementations, P*W/S (dose) is between 0.5 Joules per $cm^2$ and 10 Joules per $cm^2$, or between 0.5 Joules per $cm^2$ and 1 Joule per $cm^2$. The dose may be selected based on various factors such as the pattern 208 within the liquid crystal layer 206 (FIG. 2b) of the optical master 200, exposure wavelength of the light 604, and material properties of the liquid crystal layer 206 of the optical master 200 and the photo-alignment layer 304 of the replica structure 300.

With reference now to FIG. 7b, an example is illustrated of a schematic view of a first beam position 604a and a second beam position 604b of a light 604 with a beam width W. As illustrated, the first beam position 604a and the second beam position 604b have an overlap O. When the light beam 604 is moved in discrete steps across a photo-alignment layer, it is appreciated that the overlap may be included to compensate for non-uniformity of the light 604 produced by the light source 602. The light source 602 may produce light 604 with a Gaussian distribution or a non-square beam shape which may lead to an uneven intensity for the middle as opposed to the edge of the beam. Overlap O may mitigate the effects of the uneven intensity.

Example Augmented Reality Systems

As discussed herein, it will be appreciated that the replicated GPHs disclosed herein may be utilized as part of an eyepiece for a display system, such as a virtual reality or an augmented reality (AR) display system.

AR display systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" or "head mountable" display is a display that may be mounted on the head of a viewer or user.

In some AR systems, a plurality of waveguides may be configured to form virtual images at a plurality of virtual depth planes (also referred to simply a "depth planes" herein). Different waveguides of the plurality of waveguides may have different optical powers and may be formed at different distances from the user's eye. The display systems may also include a plurality lenses that provide or additionally provide optical powers. The optical powers of the waveguides and/or the lenses may output light with different amounts of wavefront divergence to provide images at different virtual depth planes. In some implementations, the replicated GPHs disclosed herein may advantageously be applied to the waveguides or as separate standalone layers to function as lenses. Alternatively, certain types of replicated GPHs may be formed as wavelength selective mirrors that may be used for imaging parts on or within the eye, as part of an eye-tracking system, as discussed herein.

Figure 8A:
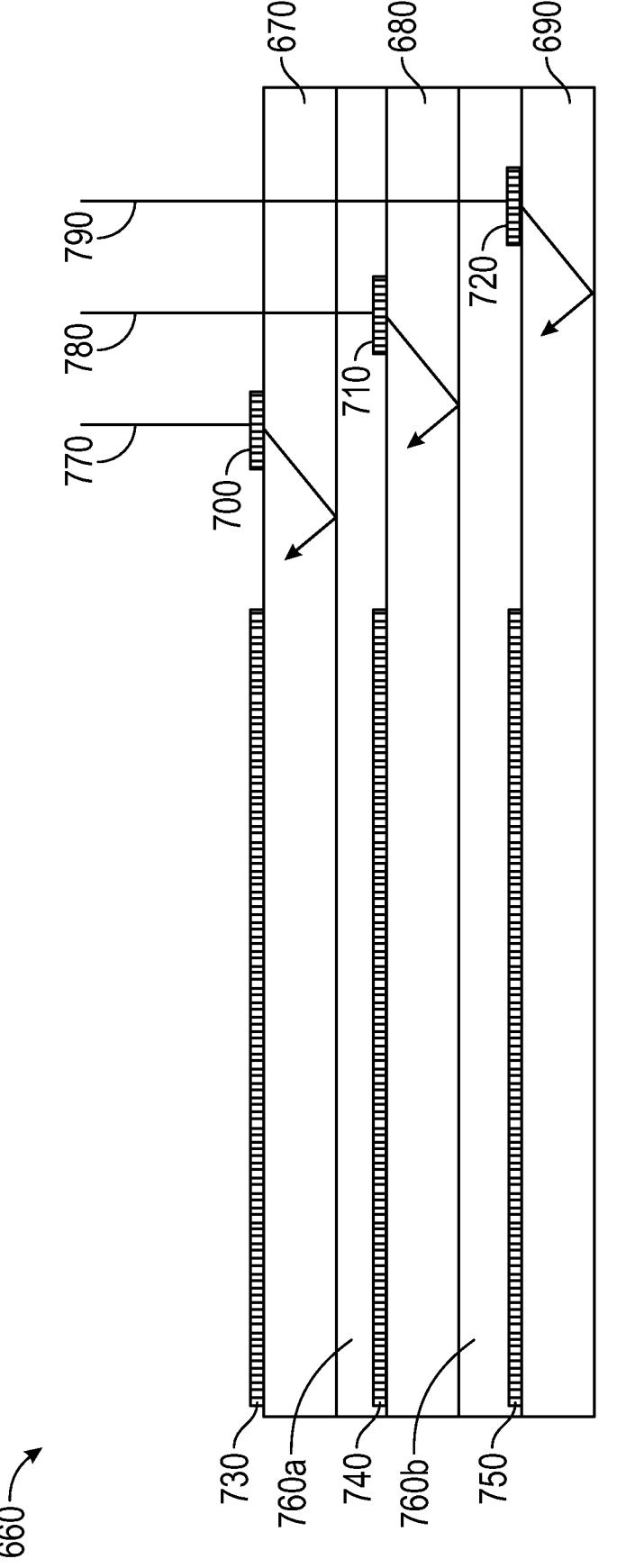
FIG. 8a illustrates a cross-sectional sideview of an example of a set of stacked waveguides that each includes an incoupling optical element usable in an augmented reality (AR) system according to some implementations of the present disclosure.

With reference now to FIG. 8a, in some implementations, light impinging on a waveguide may need to be redirected to in-couple that light into the waveguide. An in-coupling optical element may be used to redirect and in-couple the light into its corresponding waveguide. FIG. 8a illustrates a cross-sectional side view of an example of a plurality or set 660 of stacked waveguides that each includes an in-coupling optical element. The waveguides may each be configured to output light of one or more different wavelengths, or one or more different ranges of wavelengths.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some implementations, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some implementations, the in-coupling optical elements 700, 710, 720 may be disposed in the body of the respective waveguide 670, 680, 690. In some implementations, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some implementations.

As illustrated, the in-coupling optical elements 700, 710, 720 may be laterally offset from one another. In some implementations, each in-coupling optical element may be offset such that it receives light without that light passing through another in-coupling optical element.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other implementations, the light distributing elements 730, 740, 750, may be disposed on a bottom major surface of associated waveguides 670, 680, 690, respectively. In some other implementations, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some implementations, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some implementations, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some implementations, the material forming the waveguides 670, 680, 690 may be different between one or more waveguides, and/or the material forming the layers 760a, 760b may be different, while still holding to the various refractive index relationships noted above.

With continued reference to FIG. 8a, light rays 770, 780, 790 are incident on the set 660 of waveguides. It will be appreciated that the light rays 770, 780, 790 may be injected into the waveguides 670, 680, 690.

In some implementations, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some implementations, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 8*a*, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 8B:
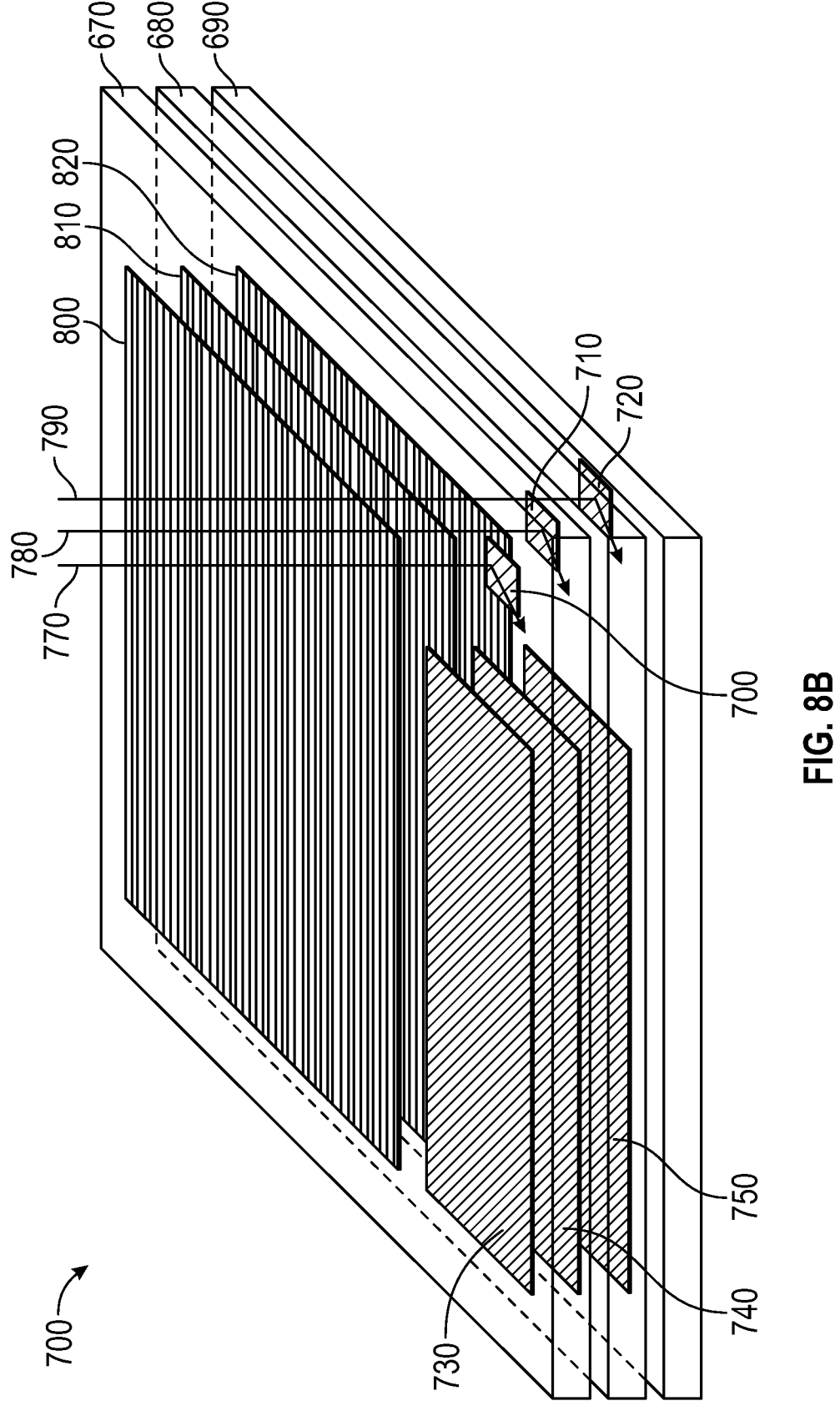
FIG. 8b illustrates a perspective view of an example of the plurality of stacked waveguides of FIG. 8a usable in an augmented reality (AR) system according to some implementations of the present disclosure.

With reference now to FIG. 8*b*, a perspective view of an example of the plurality of stacked waveguides of FIG. 8*a* is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some implementations, the light distributing elements 730, 740, 750 are orthogonal pupil expanders (OPE's). In some implementations, the OPE's deflect or distribute light to the out-coupling optical elements 800, 810, 820 and, in some implementations, may also increase the beam or spot size of this light as it propagates to the out-coupling optical elements. In some implementations, the light distributing elements 730, 740, 750 may be omitted and the in-coupling optical elements 700, 710, 720 may be configured to deflect light directly to the out-coupling optical elements 800, 810, 820. For example, with reference to FIG. 8B, the light distributing elements 730, 740, 750 may be replaced with out-coupling optical elements 800, 810, 820, respectively. In some implementations, the out-coupling optical elements 800, 810, 820 are exit pupils (EP's) or exit pupil expanders (EPE's) that direct light in a viewer's eye. It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light. In some implementations, the OPE and/or EPE may be configured to modify a size of the beams of light.

Accordingly, with reference to FIGS. 8*a* and 8*b*, in some implementations, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 8C:
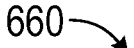
FIG. 8c illustrates a top-down plan view of an example of the plurality of stacked waveguides of FIGS. 8a and 8b usable in an augmented reality (AR) system according to some implementations of the present disclosure.
Figure 8C:
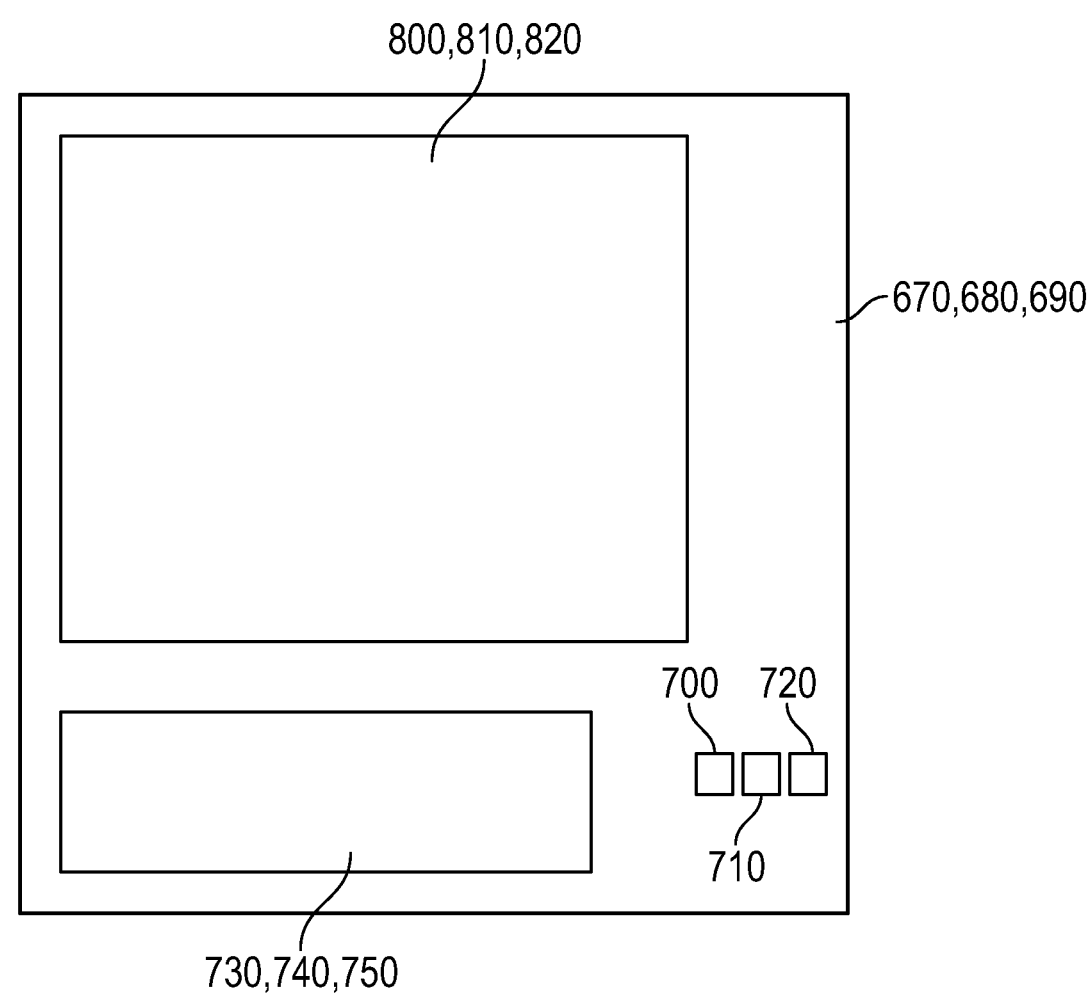

FIG. 8*c* illustrates a top-down plan view of an example of the plurality of stacked waveguides of FIGS. 8*a* and 8*b*. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some implementations, arrangements including nonoverlapping spatially-separated in-coupling optical elements may be referred to as a shifted pupil system, and the in-coupling optical elements within these arrangements may correspond to sub pupils.

Advantageously, the GPHs disclosed herein may be utilized as part of or in addition to the various optical elements noted above (e.g., the in-coupling optical elements 700, 710, 720, the light distributing element 730, 740, 750, and/or the out-coupling optical element 800, 810, 820) to provide desired optical functionality. For example, the GPHs may function as lenses and may overlay the out-coupling optical element 800, 810, 820 to provide the desired optical power.

Figure 8D:
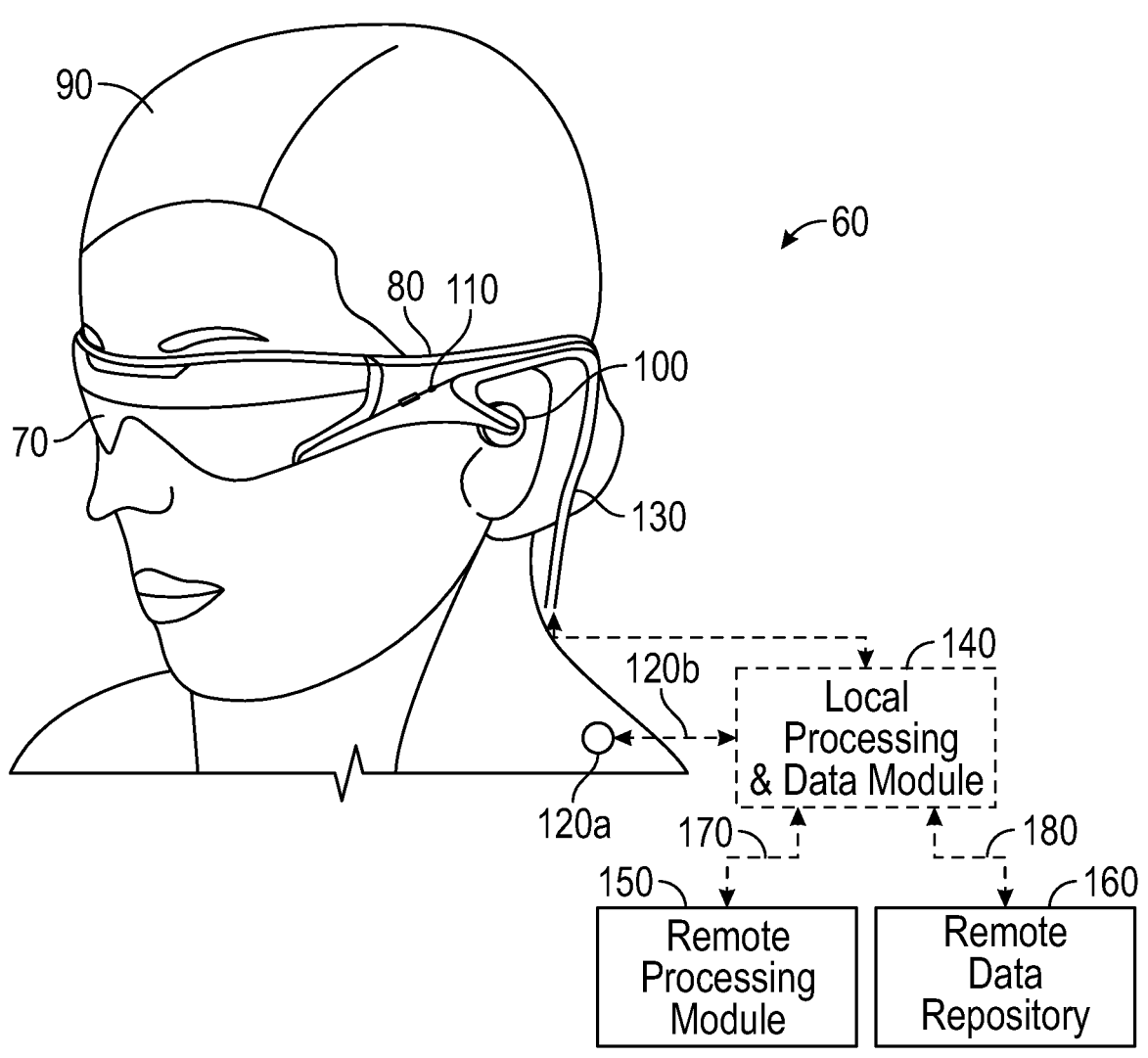
FIG. 8d illustrates an example of wearable display system according to some implementations of the present disclosure.

With reference now to FIG. 8*d*, an example as illustrated of wearable display system 60, into which the various waveguides and related systems disclosed herein may be integrated. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some implementations. In some implementations, a speaker 100 is coupled to the frame 80 and configured to be positioned adjacent the ear canal of the user 90 (in some implementations, another speaker, not shown, may optionally be positioned adjacent the other ear canal of the user to provide stereo/shapeable sound control). The display system 60 may also include one or more microphones 110 or other devices to detect sound. In some implementations, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some implementations, the display system may also include a peripheral sensor 120*a*, which may be separate from the frame 80 and attached to the body of the user 90 (e.g., on the head, torso, an extremity, etc. of the user 90). The peripheral sensor 120*a* may be configured to acquire data characterizing a physiological state of the user 90 in some implementations. For example, the sensor 120*a* may be an electrode.

With continued reference to FIG. 8*d*, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120*a* may be operatively coupled by communications link 120*b*, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some implementations, the local processing and data module 140 may include one or more of the image capture devices, microphones, inertial measurement units, accelerometers, compasses, GPS units, radio devices, and/or gyros. In some other implementations, one or more of these sensors may be attached to the frame 80, or may be standalone structures that communicate with the local processing and data module 140 by wired or wireless communication pathways.

With continued reference to FIG. 8*d*, in some implementations, the remote processing module 150 may comprise one or more processors configured to analyze and process data and/or image information, for instance including one or more central processing units (CPUs), graphics processing units (GPUs), dedicated processing hardware, and so on. In some implementations, the remote data repository 160 may comprise a digital data storage facility, which may be available through the internet or other networking configuration in a "cloud" resource configuration. In some implementations, the remote data repository 160 may include one or more remote servers, which provide information, e.g., information for generating augmented reality content, to the local processing and data module 140 and/or the remote processing module 150. In some implementations, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Example Eye-Tracking Systems

Figure 9:
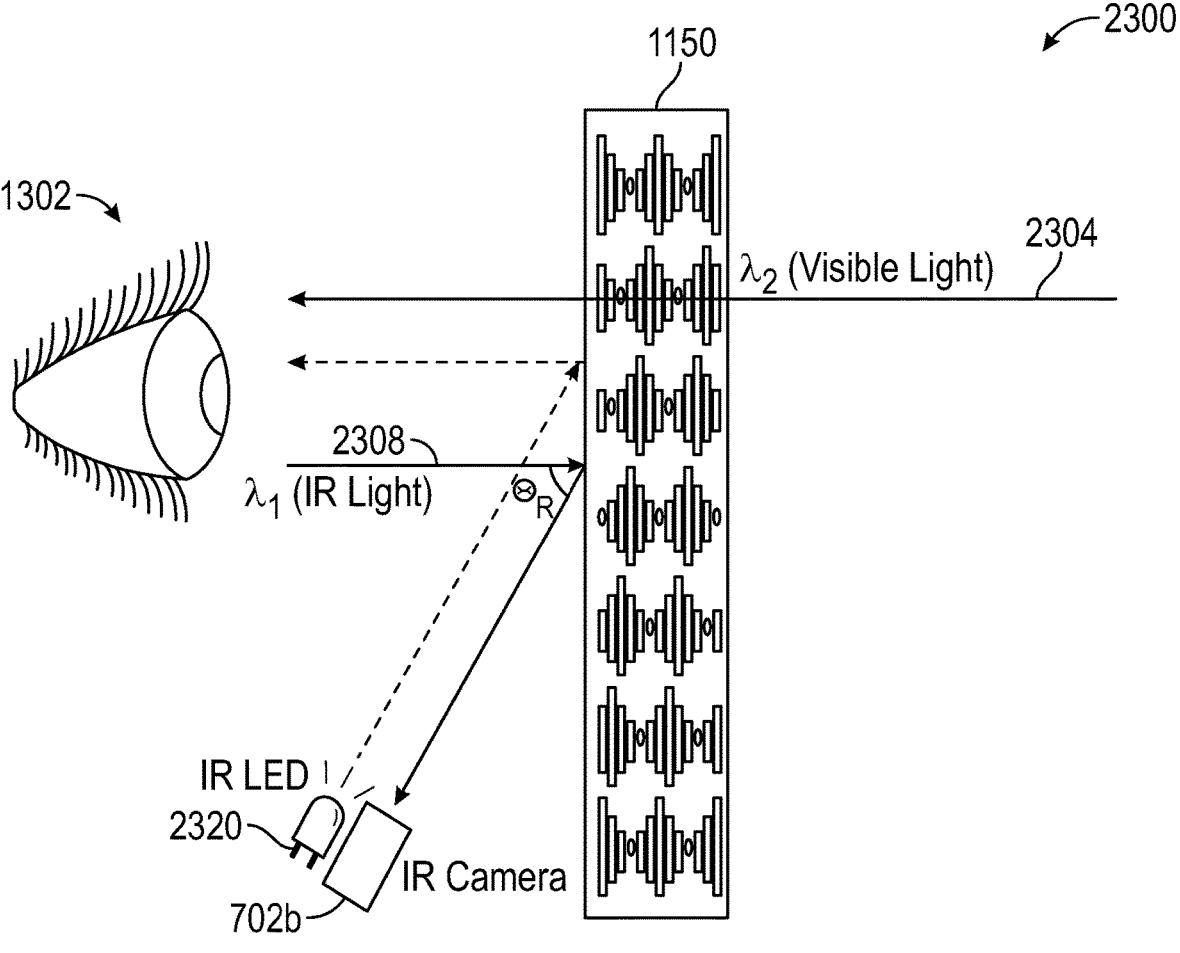
FIG. 9 illustrates an example of an imaging system comprising a forward-facing camera configured to image a wearer's eye using a liquid crystal off-axis mirror formed using an optical master according to some implementations of the present disclosure.

FIG. 9 illustrates an example of an eye-tracking system 2300 employing a liquid crystal reflector (LCR), e.g., a cholesteric liquid crystal reflector. Preferably, the liquid crystal reflector is a wavelength-selective LCR 1150 configured to image an eye 1302 of a viewer, according to various implementations. In some implementations, the LCR 1150 may be disposed on a surface of a waveguide (e.g., one of the waveguides 670, 680, 690, FIGS. 8*a*-8*b*). Eye tracking may be a key feature in interactive vision or control systems including wearable displays, e.g., the wearable display system 60 of FIG. 8*d*, for virtual/augmented/mixed reality display applications, among other applications. To achieve good eye tracking, it may be desirable to obtain images of the eye 1302 at low perspective angles, for which it may in turn be desirable to dispose an eye-tracking camera 702*b* near a central position of viewer's eyes. However, such position of the camera 702*b* may interfere with user's view. Alternatively, the eye-tracking camera 702*b* may be disposed to a lower position or a side. However, such position of the camera may increase the difficulty of obtaining robust and accurate eye tracking since the eye images are captured at a steeper angle. By configuring the LCR 1150 to selectively reflect infrared (IR) light 2308 (e.g., having a wavelength of 850 nm) from the eye 302 while transmitting visible light 2304 from the world, the camera 702*b* may be placed away from the user's view while capturing eye images at normal or low perspective angles. Such a configuration does not interfere with user's view since visible light is not reflected. The same LCR 1150 may also be configured as an IR illumination source 2320, as illustrated. A low perspective angle of IR illuminator may result in less occlusions, e.g., from eye lashes, which configuration allows more robust detection of specular reflections.

With continued reference to FIG. 9, according to various implementations, the LCR 1150 may comprise one or more cholesteric liquid crystal (CLC) layers each comprising a plurality of chiral structures, wherein each chiral structure comprises a plurality of liquid crystal molecules that extend in a layer depth direction (e.g., z-direction) and are successively rotated in a first rotation direction, as describe in U.S. Patent Publication No. 2018/0164627, the entirety of which is incorporated by reference herein. The arrangements of the liquid crystal molecules of the chiral structures vary periodically in a lateral direction perpendicular to the layer depth direction such that the one or more CLC layers are configured to substantially Bragg-reflect a first incident light having a first wavelength ($\lambda_1$) while substantially transmitting a second incident light having a second wavelength ($\lambda_2$). Each of the one or more CLC layers may be configured to substantially Bragg-reflect elliptically or circularly polarized first and second incident light having a handedness of polarization that is matched to the first rotation direction, when viewed in the layer depth direction, while being configured to substantially transmit elliptically or circularly polarized first and second incident light having a handedness of polarization that is opposite to the first rotation direction, when viewed in the layer depth direction. According to some implementations, the arrangements of the liquid crystal molecules varying periodically in the lateral direction are arranged to have a period in the lateral direction such that a ratio between the first wavelength and the period is between about 0.5 and about 2.0. According to some implementations, the first wavelength is in the near infrared range between about 600 nm and about 1.4 μm, for instance about 850 nm and the second wavelength in is in the visible range having one or more colors. According to some implementations, the liquid crystal molecules of the chiral structures are pre-tilted relative to a direction normal to the layer depth direction. The one or more CLC layers may be configured such that the first incident light is reflected at an angle (OR) relative to the layer depth direction (z-direction) exceeding about 50°, about 60°, about 70° or about 80° degrees relative to the layer depth direction.

With continuing reference to FIG. 9, the eye 1302 of the wearer of a head mounted display (HMD) may be imaged using a reflective off-axis liquid crystal reflector 1150 which may provide the camera 702B with a view of the eye 1302, and which may also reflect eye illuminating light from light source 2320. The resulting images may be used to track an eye or eyes, image the retina, reconstruct the eye shape in three dimensions, extract biometric information from the eye (e.g., iris identification), etc.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every implementation.

It will be appreciated that conditional language used herein, such as, among others, "can," "could," "might," "may," "e.g.," and the like, unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without author input or prompting, whether these features, elements and/or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

Accordingly, the claims are not intended to be limited to the implementations shown herein, but are to be accorded the widest scope consistent with this disclosure, the principles and the novel features disclosed herein.

What is claimed is:

1. A method of forming an optical master, the method comprising:

disposing a photo-alignment layer on a substrate;

propagating light through a first optical master to the photo-alignment layer, wherein the first optical master comprises:

an alignment layer including surface relief features, and a first liquid crystal layer on the surface relief features, wherein liquid crystal molecules of the first liquid crystal layer define a liquid crystal pattern, and wherein propagating the light through the first optical master to the photo-alignment layer replicates the liquid crystal pattern in the photo-alignment layer; and depositing a second liquid crystal layer on the photo-alignment layer to form the optical master, wherein the molecules of the second liquid crystal layer are aligned by the photo-alignment layer, and wherein the optical master comprises the second liquid crystal layer, the photo-alignment layer, and the substrate, wherein the light comprises one of left and right circularly polarized light, wherein the first liquid crystal layer diffracts the light into left circularly polarized light and right circularly polarized light, wherein one of the left and the right circularly polarized light is +1 or −1 diffraction order light and the other of the left and the right circularly polarized light is zero diffraction order light, and wherein the first liquid crystal layer diffracts about half the light into left circularly polarized light and about half the light into right circularly polarized light.

2. The method of claim 1, wherein the alignment layer comprises an imprint layer.

3. The method of claim 1, wherein the liquid crystal layer comprises a nematic liquid crystal layer.

4. The method of claim 1, wherein the surface relief features comprise nanostructures and the first liquid crystal layer is disposed on the alignment layer such that the liquid crystal molecules of the first liquid crystal layer align with the nanostructures.

5. The method of claim 4, wherein the nanostructures comprise imprinted nanostructures.

6. The method of claim 4, wherein the nanostructures comprise an optical phase and a grating period, and wherein the liquid crystal molecules of the first liquid crystal layer are aligned by the nanostructures to include substantially same optical phase and grating period.

7. The method of claim 1, wherein the first liquid crystal layer has a thickness of about d, wherein d=λ/(2Δn), where λ is the wavelength of light propagated through the first optical master to the photo-alignment layer, and where Δn is the birefringence of the first liquid crystal layer.

8. The method of claim 7, wherein the first liquid crystal layer has an optical phase and a grating period, wherein after replicating the liquid crystal pattern, the photo-alignment layer has an optical phase of about double the optical phase of the first liquid crystal layer and a grating period of about half the grating period of the first liquid crystal layer.

9. The method of claim 7, wherein the light comprises linearly polarized light.

10. The method of claim 1, wherein the first liquid crystal layer has a thickness of about d, wherein d=λ/(4Δn), where λ is the wavelength of light propagated through the first optical master, and Δn is the birefringence of the first liquid crystal layer.

11. The method of claim 10, wherein the first liquid crystal layer comprises an optical phase and a grating period, wherein after replicating the liquid crystal pattern, the photo-alignment layer has an optical phase and a grating period equal to that of the first liquid crystal layer.

12. The method of claim 1, wherein propagating light through the first optical master comprises positioning a collimated light source over the first optical master such that the collimated light source illuminates at least a portion of the first optical master.

13. The method of claim 12, wherein propagating light through the first optical master further comprises moving the collimated light source to a different portion of the first optical master.

14. The method of claim 13, wherein the collimated light source comprises a beam power (P) and beam width (W), and wherein the collimated light source is moved at a scanning speed(S), wherein a dose provided by the collimated light source equals P*W/S, and wherein the dose is between 0.5 Joules per cm² and 10 Joules per cm².

15. The method of claim 14, wherein the scanning speed provides a total light exposure time of less than ⅙ second over any portion of the photoalignment layer.

* * * * *